(12) United States Patent
Hohler

(10) Patent No.: US 7,345,635 B2
(45) Date of Patent: Mar. 18, 2008

(54) APPARATUS FOR ENCAPSULATING RADIO FREQUENCY IDENTIFICATION (RFID) ANTENNAE

(75) Inventor: Donald W. Hohler, Eustis, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 7 days.

(21) Appl. No.: 11/243,246

(22) Filed: Oct. 4, 2005

(65) Prior Publication Data
US 2007/0075866 A1 Apr. 5, 2007

(51) Int. Cl.
*H01Q 1/24* (2006.01)
(52) U.S. Cl. .................... 343/702; 340/572.7
(58) Field of Classification Search ............ 343/702, 343/764–766, 866; 340/572.7, 572.8; 235/440
See application file for complete search history.

(56) References Cited

U.S. PATENT DOCUMENTS

| | | | |
|---|---|---|---|
| 5,929,760 A | 7/1999 | Monahan | |
| 6,236,316 B1 | 5/2001 | Eberhardt et al. | |
| 6,269,943 B1 | 8/2001 | Mott | |
| 6,375,780 B1 | 4/2002 | Tuttle et al. | |
| 6,441,741 B1 | 8/2002 | Yoakum | |
| 6,956,538 B2 * | 10/2005 | Moore | 343/878 |
| 6,985,361 B2 * | 1/2006 | Credelle et al. | 361/736 |
| 7,154,283 B1 * | 12/2006 | Weakley et al. | 324/750 |

* cited by examiner

*Primary Examiner*—Huedung Mancuso
(74) *Attorney, Agent, or Firm*—Antony P. Ng; Dillon & Yudell LLP

(57) ABSTRACT

An apparatus capable of being retrofitably installed on a conveyor having a radio frequency identification (RFID) system is disclosed. The apparatus includes a non-metallic frame and multiple mounting means for facilitating the mounting of the non-metallic frame onto a metallic slider bed of the conveyor. The apparatus can be inserted between a conveyor belt and the metallic slider bed of the conveyor. The non-metallic frame has a low-friction upper surface to allow the conveyor belt to easily slide over the low-friction upper surface. The non-metallic frame also includes at least one receptacle for encapsulating an RFID antenna for detecting RFID tags.

7 Claims, 3 Drawing Sheets

APPARATUS FOR ENCAPSULATING RADIO FREQUENCY IDENTIFICATION (RFID) ANTENNAE

BACKGROUND OF THE INVENTION

1. Technical Field

The present invention relates to radio frequency identification (RFID) systems in general, and in particular to RFID systems for detecting thin flexible RFID tags. Still more specifically, the present invention relates to an apparatus for encapsulating RFID antennae used in RFID systems for detecting thin flexible RFID tags.

2. Description of Related Art

Radio frequency identification (RFID) systems have been commonly utilized for tracking discrete objects, such as luggages, packages, and the like, being carried on automatic transport systems. An RFID system is typically made up of an array of antennae and a controller for interfacing between the array of antennae and a host computer. The array of antennae utilizes a high frequency signal to interrogate RFID tags fixed to or embedded in objects that are being moved on an interrogation path of an automatic transport system such as a conveyor.

Because the placement of the array of antennae is critical to the interrogation and receipt of identification code and other data transmitted to and from RFID tags, the array of antennae is generally disposed adjacent to an interrogation path of an automatic transport system. For example, several rectangular (or square) shape frame antennae are commonly fitted around a conveyor belt of a conveyor in order to provide sufficient coverage for RFID tags attached to objects that are being moved along the conveyor belt.

When an RFID tag is positioned underneath an object, the RFID tag cannot be easily read by antennae positioned above or on the two sides of the conveyor. Although the object can be manually turned over in order to orient the RFID tag in relation to the antennae for better detection, such manipulation is labor intensive as well as time-consuming. One solution is to have antennae installed under the slider bed of the conveyor. However, such installation requires that one section of the metallic slider bed be replaced by a non-metallic slider bed section because the metallic slider bed can reduce the detection effectiveness of the antennae located underneath. But the replacement of an entire section of the metallic slider bed is a costly proposition. Consequently, it would be desirable to provide a more economical method for installing antennae for reading RFID tags located under an object being tracked.

SUMMARY OF THE INVENTION

In accordance with a preferred embodiment of the present invention, an apparatus designed for encapsulating radio frequency identification (RFID) antennae can be retrofitably installed on a conveyor having an RFID system. The apparatus includes a non-metallic frame and multiple mounting means for facilitating the mounting of the non-metallic frame onto a metallic slider bed of the conveyor. The apparatus can be inserted between a conveyor belt and the metallic slider bed. The non-metallic frame has a low-friction upper surface to allow the conveyor belt to easily slide over the low-friction upper surface. The non-metallic frame also includes at least one receptacle for encapsulating an RFID antenna for detecting RFID tags.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
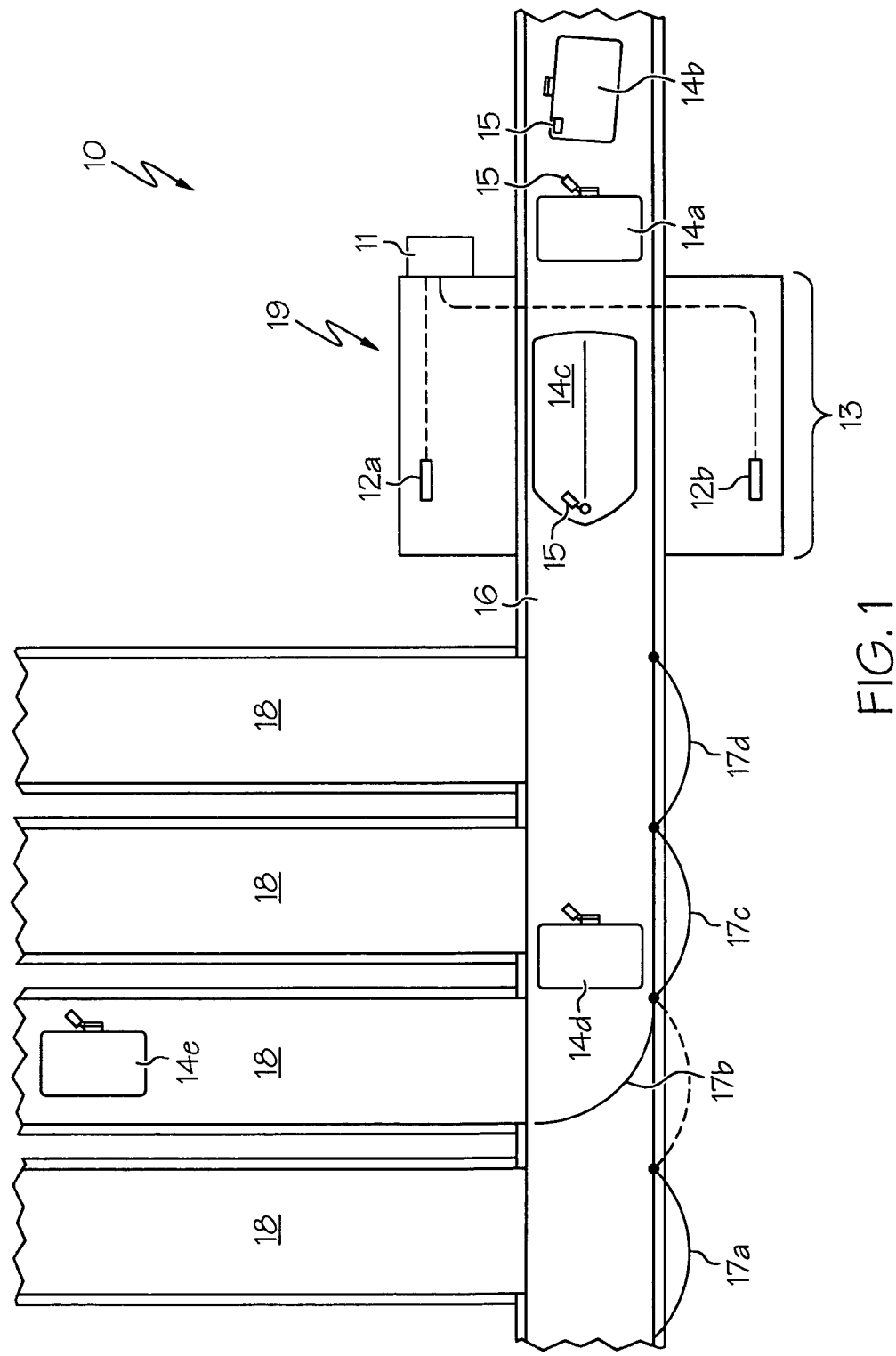
FIG. 1 is a diagram of a conveyor having a radio frequency identification (RFID) system in which a preferred embodiment of the present invention can be incorporated.

Referring now to the drawings and in particular to FIG. 1, there is illustrated a diagram of conveyor having a radio frequency identification (RFID) system in which a preferred embodiment of the present invention can be incorporated. As shown, a conveyor 10 includes a primary conveyor mechanism 16 and a secondary conveyor mechanism 18. Conveyor 10 is equipped with an RFID system 19 at a section 13 of primary conveyor mechanism 16. RFID system 19 includes a controller 11 coupled to an array of antennae, such as antennae 12a and 12b. Although not shown in FIG. 1, the array of antennae also includes additional antennae located above and underneath primary conveyor mechanism 16 at section 13 of conveyor 10.

RFID system 19 is capable of interrogating luggages, such as luggages 14a-14e, each having an RFID tag 15 attached. Specifically, the array of antennae located at section 13 of primary conveyor mechanism 16 interrogates RFID tags 15 as luggages to which they are attached are being carried past the array of antennae located at section 13. As shown in FIG. 1, luggage 14c is being interrogated by the array of antennae located at section 13 of primary conveyor mechanism 16. RFID tags 15 may contain various information associated with the luggages to which they are attached. For example, RFID tags 15 may contain destination and routing information for luggages 14a-14e.

The array of antennae at section 13 relates the information stored within RFID tags 15 to controller 11. In turn, controller 11 sends the information to a host computer (not shown) within RFID system 19. Based on the information supplied by RFID system 19, conveyor 10 sorts luggages that are being moved along primary conveyor mechanism 16 so that the luggages can be automatically routed to their appropriate destination. The routing function may be accomplished by temporarily closing one of gates 17a-17d across primary conveyor mechanism 16. As shown in FIG. 1, gate 17b causes luggage 14e to be diverted onto secondary conveyor mechanism 18 corresponding to the destination and routing information contained within the RFID tag attached to luggage 14e.

Figure 2:
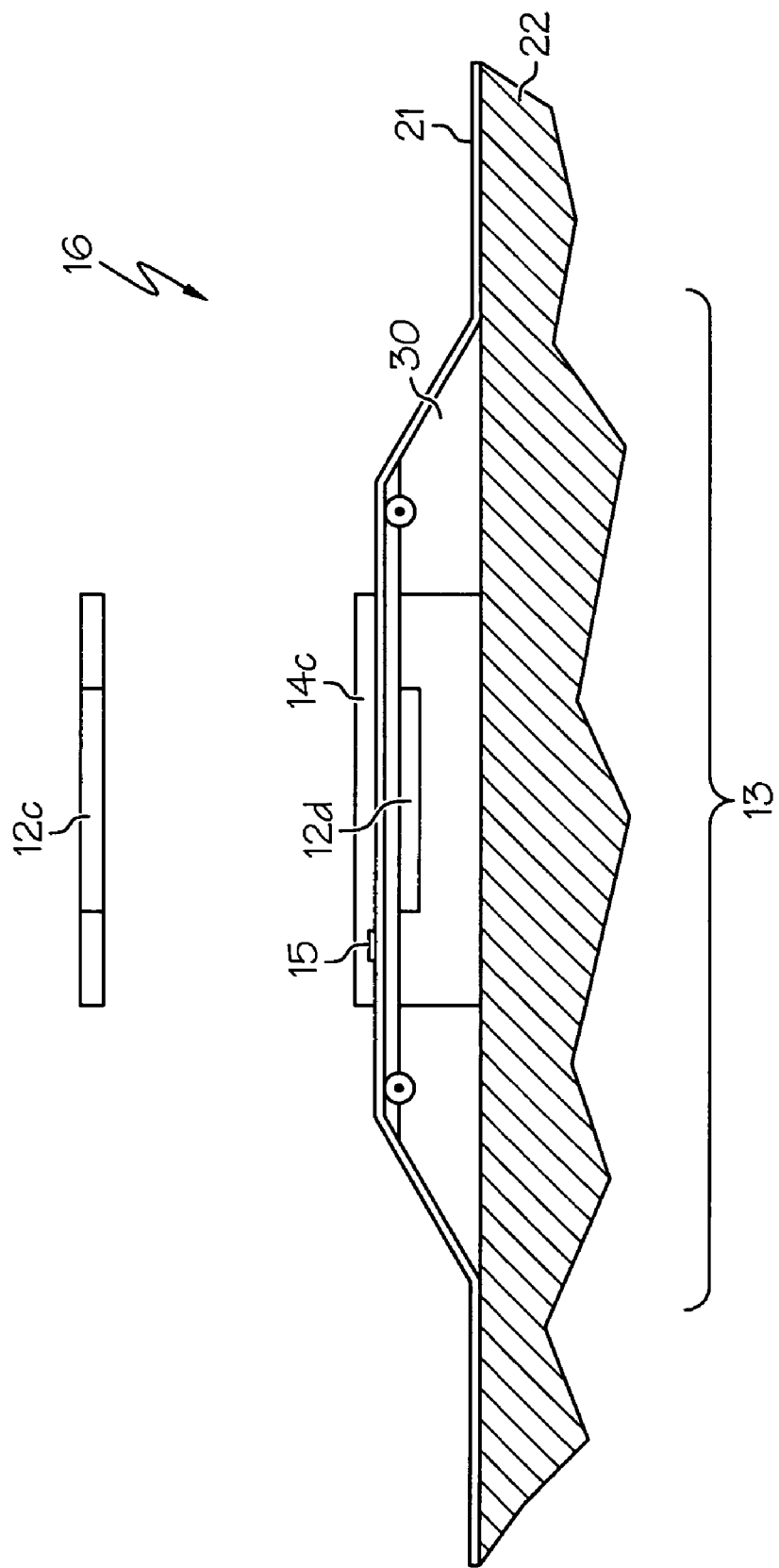
FIG. 2 is a cross-sectional diagram of a section along a primary conveyor mechanism of the conveyor from FIG. 1, in accordance with a preferred embodiment of the present invention.

With reference now to FIG. 2, there is depicted a cross-sectional diagram of section 13 along primary conveyor mechanism 16, in accordance with a preferred embodiment of the present invention. As shown, section 13 includes a metallic slider bed 22 and a conveyor belt 21 positioned on top of metallic slider bed 22. Conveyor belt 21 is capable of transporting multiple luggages while moving on top of metallic slider bed 22, as is well-known to those skilled in the art. Section 13 also includes antennae 12c and 12d for interrogating RFID tags, such as RFID tag 15 attached to luggage 14c, that move along primary conveyor mechanism 16. Antennae 12c and 12d are part of the array of antennae mentioned previously.

Antenna 12d is encapsulated in a slider panel 30 disposed between conveyor belt 21 and metallic slider bed 22. Slider panel 30 is mostly made of non-metallic materials such that slider panel 30 will not interfere with the radio frequency communications between antenna 12d and RFID tag 15.

Figure 3A:
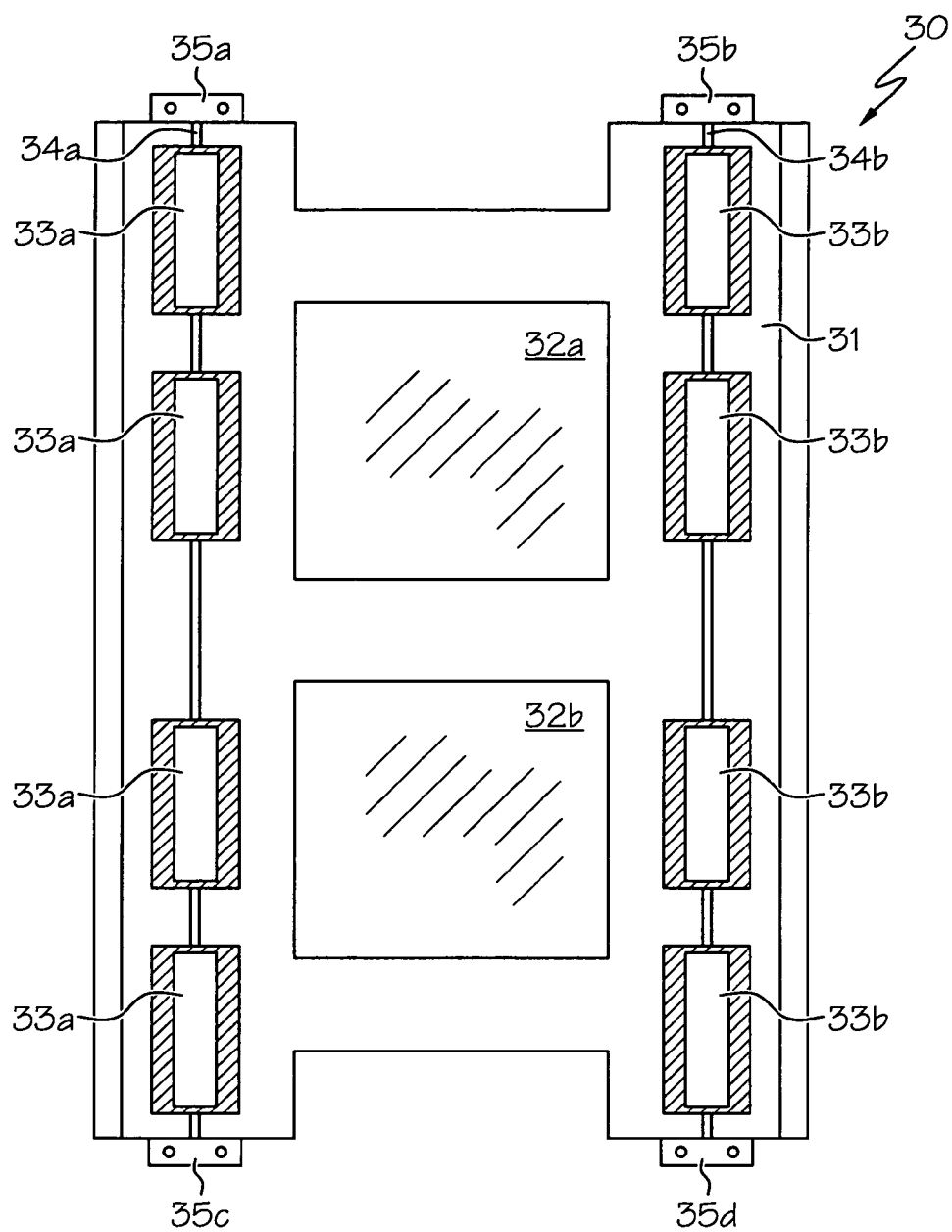
FIG. 3a is a top view of a slider panel within the section from FIG. 2, in accordance with a preferred embodiment of the present invention.

Referring now to FIG. 3a, there is illustrated a top view of slider panel 30, in accordance with a preferred embodiment of the present invention. As shown, slider panel 30 includes a rigid frame 31 preferably made of ultra-high molecular weight (UHMW) plastic. Frame 31 has a cavity 32a and a cavity 32b in which antenna 12d (from FIG. 2) can be deposited. Slider panel 30 also includes rollers 33a and rollers 33b positioned within their respective cavity. Rollers 33a and rollers 33b are held in place within their respective cavity by a metallic rod 34a and a metallic rod 34b, respectively. With metallic rod 34a and metallic rod 34b securely fastened at each end, rollers 33a and rollers 33b can be spun freely within their respective cavity. Rollers 33a and rollers 33b are preferably made of UHMW plastic also. Slider panel 30 can be securely mounted on metallic slider bed 22 (from FIG. 2) via metal tabs 35a-35d. For example, multiple screws can be utilized to securely fasten slider panel 30 onto metallic slider bed 22 through metal tabs 35a-35d.

It is imperative that slider panel 30 be relatively thin such that slider panel 30 can be inserted between conveyor belt 21 and metallic slider bed 22 while without incurring additional friction between conveyor belt 21 and metallic slider bed 22. The length of slider panel 30 should, but not necessary, be the same as the width of conveyor belt 21. For the present embodiment, slider panel 30 is approximately three feet long, one and a half feet wide and one inch thick. Each of rollers 33a and 33b is approximately two inches long with one inch diameter.

Figure 3B:
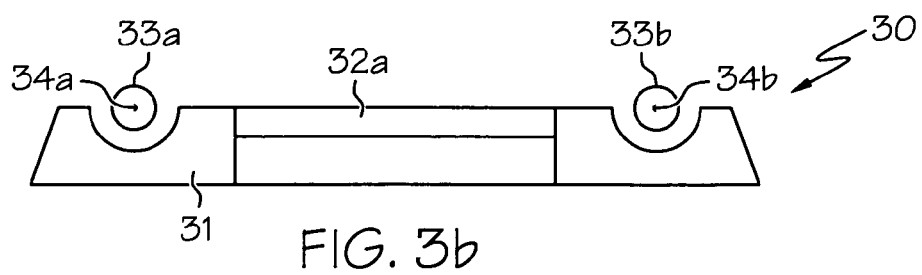
FIG. 3b is a cross-sectional view of the slider panel from FIG. 3a, in accordance with a preferred embodiment of the present invention.

With reference now to FIG. 3b, there is illustrated a cross-sectional view of slider panel 30 along cavity 32a, in accordance with a preferred embodiment of the present invention. As shown, the cross-section of slider panel 30 has a trapezoidal shape. The trapezoidal shape of slider panel 30 allows luggages to be rolled up from one slanted side of slider panel 30 and rolled down from the other slanted side. The top surface of slider panel 30 is relatively smooth (i.e., low friction). Rollers 33a and 33b on slider panel 30 also facilitate the moving of a conveyor belt, such as conveyor belt 21 from FIG. 2, along the top surface of slider panel 30.

As has been described, the present invention provides a non-metallic slider panel for encapsulating RFID antennae used in an RFID system for detecting RFID tags. The non-metallic slider panel enables an economical way to install antennae underneath a conveyor belt of a conveyor such that RFID tags located underneath an object being tracked can be conveniently read.

While the invention has been particularly shown and described with reference to a preferred embodiment, it will be understood by those skilled in the art that various changes in form and detail may be made therein without departing from the spirit and scope of the invention.

What is claimed is:

1. An apparatus for encapsulating radio frequency identification (RFID) antennae for use in an RFID system, said apparatus comprising:
   a non-metallic frame includes a low-friction upper surface and a trapezoidal shape cross-section;
   at least one cavity located within said non-metallic frame for receiving an RFID antenna; and
   a plurality of mounting tabs located on said non-metallic frame for facilitating the mounting of said non-metallic frame onto a slider bed of a conveyor to allow a conveyor belt to glide over said low-friction upper surface of said non-metallic frame.

2. The apparatus of claim 1, wherein said non-metallic frame has a low-profile.

3. The apparatus of claim 1, wherein said non-metallic frame is made of ultra-high molecular weight plastic.

4. The apparatus of claim 1, wherein said low-friction upper surface includes a plurality of rollers.

5. The apparatus of claim 4, wherein said plurality of rollers are made of ultra-high molecular weight plastic.

6. The apparatus of claim 4, wherein said plurality of rollers are secured to said non-metallic frame by a plurality of rods.

7. The apparatus of claim 1, wherein said trapezoidal shape cross-section includes a first and second slanted sides such that a luggage is allowed to be rolled up from said first slanted side and rolled down from said second slanted side.

* * * * *